United States Patent [19]
Vivers

[11] Patent Number: 5,672,943
[45] Date of Patent: Sep. 30, 1997

[54] ELECTRONIC CONTROL APPARATUS

[75] Inventor: Peter Vivers, Warrington, United Kingdom

[73] Assignee: GEC Alsthom Limited, United Kingdom

[21] Appl. No.: 356,368

[22] PCT Filed: Apr. 27, 1994

[86] PCT No.: PCT/GB94/00901

§ 371 Date: Feb. 7, 1995

§ 102(e) Date: Feb. 7, 1995

[87] PCT Pub. No.: WO94/25906

PCT Pub. Date: Nov. 10, 1994

[30] Foreign Application Priority Data

Apr. 27, 1993 [GB] United Kingdom ............... 9308656

[51] Int. Cl.$^6$ ............................................. G05B 19/04
[52] U.S. Cl. ...................... 318/103; 318/112; 307/40; 200/51.05
[58] Field of Search ........................ 318/34, 101, 102, 318/103, 112; 200/42.01, 42.02, 51.05; 361/160, 170, 171; 307/38, 40

[56] References Cited

U.S. PATENT DOCUMENTS 3,689,892  9/1972  Glenn et al. .
4,150,328  4/1979  Cannon .
4,233,666  11/1980 Walberg et al. .
4,289,997  9/1981  Jung et al. .
4,675,582  6/1987  Hommes et al. ................. 318/38
5,138,548  8/1992  Kienle .

FOREIGN PATENT DOCUMENTS 0 468 803 A2  1/1992  European Pat. Off. .
3723024A1    1/1989  Germany .
4156739      5/1992  Japan .

Primary Examiner—Bentsu Ro
Attorney, Agent, or Firm—Kirschstein, et al.

[57] ABSTRACT

Electronic control apparatus of a kind used in low voltage industrial equipment such as assemblies of motors or circuit breakers. Where an overall controller, e.g. a programmable logic controller (PLC) controls an array of (e.g.) motors (M1, M2, M3) by way of respective control units (13, 23, 33) identification or location of selected motors is usually effected by an address stored in the respective control unit. A faulty control unit entails replacement and loss of the location address which has to be reentered as a skilled operation. The invention provides a separate non-volatile memory (15, 25, 35) for the location address, this memory being physically associated with the particular motor (M1, etc.). A replacement control unit (13, 23, 33) is automatically loaded with the location address which was retained.

6 Claims, 1 Drawing Sheet

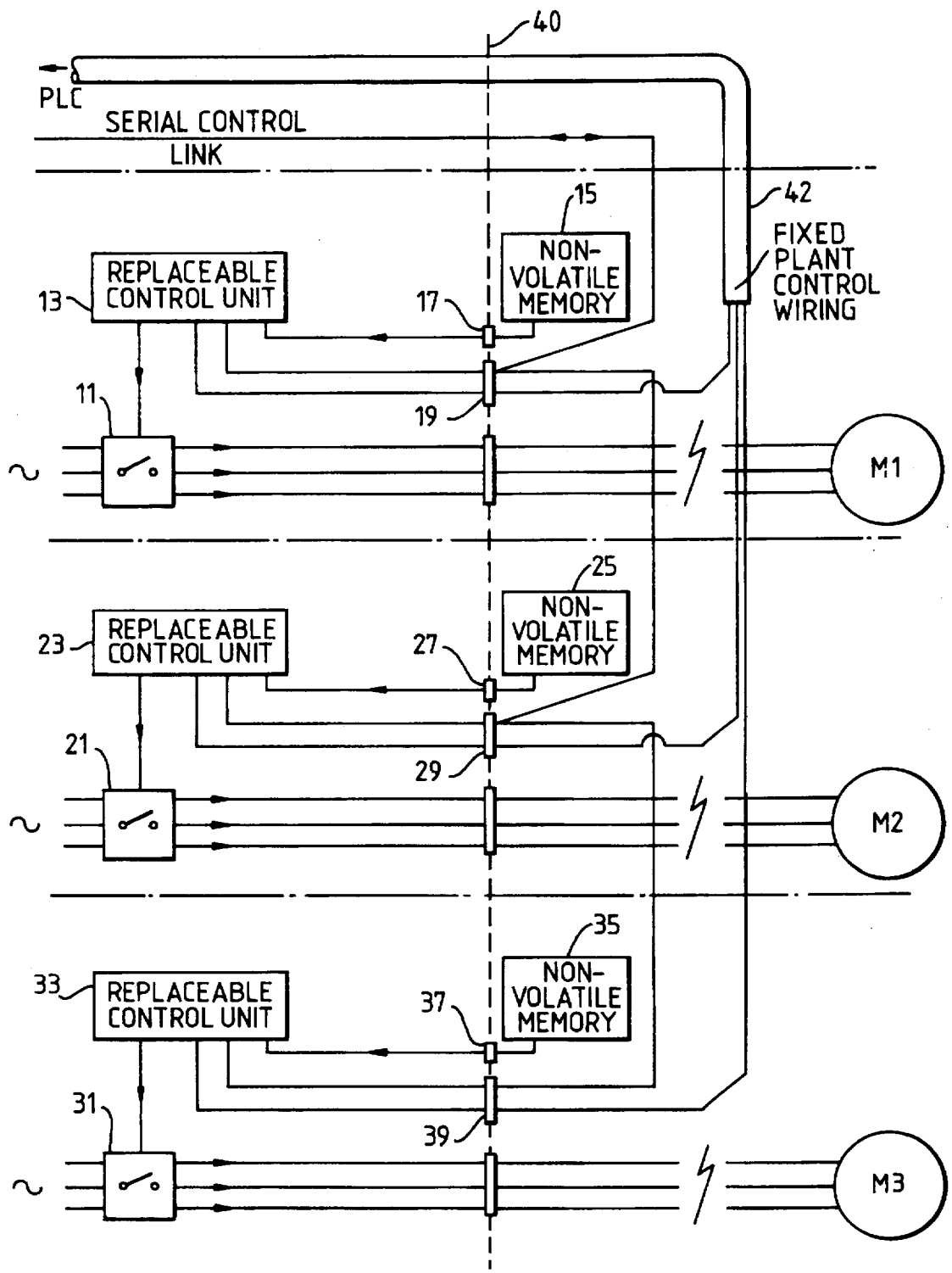

ELECTRONIC CONTROL APPARATUS

BACKGROUND OF THE INVENTION

This invention relates to electronic control apparatus, and particularly, but not exclusively, to programmable electronic industrial control and protection apparatus.

Such control and protection apparatus may be, for example, in the form of a control unit or a system incorporating such control units for industrial low voltage control gear. The system may typically have motor control centres for the grouped control of a.c. machines in a voltage range of say 380–660 V, or the system may have control units for the control of fixed speed d.c. machines in the range of say 110–300 V. Such control and protection apparatus within the scope of this invention may also be for other installed equipment, such as low voltage air circuit breakers.

Such known programmable electronic industrial control and protection apparatus which includes control units associated on a one to one basis with individual items of installed equipment (motors, distribution panels etc) commonly contains the parameters specific to that equipment locally in onboard software memory incorporated in the control apparatus. This means that when that electronic control apparatus fails and a replacement is installed there is a significant chance of the parameters being entered incorrectly. Even where that equipment can have its parameters entered remotely via a serial link its unique address still needs to be set up locally.

IEC specifications refer to installed equipments mentioned above of whatever type as functional units. We can conveniently refer to the programmable electronic industrial control and protection apparatus described above of whatever type, and associated with each such functional unit, as a control unit. Thus where a number of functional units are at different locations, each having a control unit associated with the specific functional unit at its unique location, and the functional units are all linked to a programmable logic controller or are all linked in a computer system then the first essential information for correct operation of the functional units is that the correct address of each functional unit is held at its location. As mentioned above each such location address of a functional unit has hitherto been held in software in the associated control unit; and furthermore it has been necessary for a skilled person to be present at that location to input the correct address into the control unit software. Thus when a control unit fails at a particular location and it is replaced by a new control unit, it has needed a skilled person to input software in the new control unit with all the parameters which were in the old control unit. Thus undesirable results will occur if any parameters are entered incorrectly by human error into the new control unit. In particular if the wrong address is entered then the result, which could for example be the wrong functional unit in a linked system of units in an industrial installation being brought into operation by its motor being started by its new control unit, could be catastrophic. Such problems are no less, and perhaps more, likely if the control units are grouped together in a control centre remote from distributed funtional units.

An object of this invention is to overcome the above-described problem.

SUMMARY OF THE INVENTION

According to the present invention electronic control apparatus for the control of functional electrical power units comprises a respective control unit for each functional unit, the control unit identifying the associated functional unit to central logic control means by means of a logic address, the control apparatus further comprising a respective non-volatile memory physically associated with each function unit, said logic address being available to the respective control unit and to any replacement control unit.

According to an aspect of the invention, in a motor control system including an electric control apparatus as aforesaid, electric motors contitute the functional electric power units.

According to a further aspect of the invention, a control system includes electronic control apparatus as aforesaid, electric motors, constituting the functional electrical power units, and central logic control means.

According to a further aspect of the invention, a control system includes electronic control apparatus as aforesaid and electric circuit breakers constituting the functional electrical power units.

A system according to this aspect may include central logic control means.

BRIEF DESCRIPTION OF THE DRAWINGS

An embodiment of the invention as embodied in a motor control centre will now be described, by way of example, with reference to the accompanying drawing.

DETAILED DESCRIPTION OF THE PREFERRED EMBODIMENTS

Referring to the drawing, this shows a motor control centre for the integrated control of (in this example) three motors M1, M2 and M3. These motors may be remote from the control centre and from each other. They are powered by a 3-phase supply by way of respective contactors 11, 21 and 31. The contactors are in turn controlled by control units 13, 23 and 33 known as CCUs (contactor control unit. In conventional systems of this kind the CCUs include memories which are loaded with the location address, effectively the identity, of the respective functional units, in this case the motors M1, M2 and M3. As explained above, if a CCU fails and is replaced it then has to be loaded with at least the address of the motor and it is in this circumstance that errors may occur, with possibly very serious consequences.

In the control centre of the accompanying drawing a separate non-volatile memory 15, 25 or 35, is used in conjunction with each CCU. This memory is physically associated with the plant rather than with the control unit, in that the control unit (CCU) can be removed and replaced without in any way disturbing the non-volatile memory. The memories 15, 25 and 35 are thus known, (to the applicants) as Plant Associated Memory Modules ('PAMMs').

An interface 40 separates the permanently associated elements to the right, essentially the functional units M1 etc and the PAMMS 15 etc, from the remainder of the control equipment and in particular, from the CCUs 13, 23 and 33.

The PAMM (eg 15) for each CCU (eg 13) is resident in the cabling/marshalling area of the motor control centre cubicle. Just as the plant control wiring 42 is fixed, so is the PAMM. The PAMM and control wiring are connected to the CCU via plug and socket connectors (17,19,27,29 and 37,39). This allows the tray containing the CCU to be removeable in the normal way for maintenance or repair. If a replacement tray is now fitted, the CCU will take on the address, status and configuration for that location in the system.

As implied above, the non-volatile memory (PAMM) may and preferably does store data over and above the address of the functional unit, thus it may be loaded with the configuration of the functional unit and also with its status. The PAMM may also include other parameters relating to the installation i.e. a history of faults and operational measurements and apparatus specific data, eg relating to loss of power and associated temperature conditions. All of this data may be loaded into the non-volatile memory and automaticily transferred to the control unit on plugging the latter into its tray/chassis.

The motors in the present embodiment are not supplied, as may appear, by way of a further plug and socket at the interface, but do have removable terminal connections providing a semi-permanent connection.

The control units 13,23,33 are controlled in response to a programmable logic controller (PLC-not shown) by way of fixed control wiring 42, the controller having address information for each functional unit (motor) and controlling and monitoring selected units accordingly.

It will be seen that the invention permits the replacement of a control unit to be a simple maintenance operation not requiring human skill otherwise needed to enter the correct location address into the software of the new control unit.

I claim:

1. Electronic control apparatus for the control of functional electrical power units, the control apparatus comprising:

a respective replaceable control unit for each functional unit, the replaceable control unit identifying the associated functional unit to a central logic control means by means of a logic address; and a respective non-volatile memory physically associated with each functional unit, said logic address being stored in said non-volatile memory and being available to the respective replaceable control unit and to any replacement control unit.

2. The electronic control apparatus according to claim 1, and including electric motors constituting said functional electrical power units.

3. The electronic control apparatus according to claim 1, electric motors constituting said functional electrical power units, and wherein the central logic control means is a programmable logic controller.

4. The electronic control apparatus according to claim 1 and electric circuit breakers constituting said functional electrical power units.

5. The electronic control apparatus according to claim 4, wherein the central logic control means is a programmable logic controller.

6. The electronic control apparatus according to claim 1, and including plug and socket connectors between a respective replaceable control unit and fixed control wiring.

* * * * *